United States Patent

Ishikawa

[11] Patent Number: 5,857,936
[45] Date of Patent: Jan. 12, 1999

[54] DIFFERENTIAL LIMITING MECHANISM OF DIFFERENTIAL APPARATUS

[75] Inventor: Yasuhiko Ishikawa, Tochigi-ken, Japan

[73] Assignee: Tochigi Fuji Sangyo Kabushiki Kaisha, Japan

[21] Appl. No.: 904,002

[22] Filed: Jul. 31, 1997

[30] Foreign Application Priority Data

Aug. 1, 1996  [JP]  Japan .................................. 8-203803

[51] Int. Cl.$^6$ .............................. F16H 48/22; F16D 13/24
[52] U.S. Cl. ............................................. 475/231; 475/230
[58] Field of Search .................................. 475/230, 231, 475/236; 74/606 R

[56] References Cited

U.S. PATENT DOCUMENTS

| | | | |
|---|---|---|---|
| 2,158,157 | 5/1939 | Seeck ........................................ | 475/236 |
| 2,869,399 | 1/1959 | Miles . | |
| 3,057,226 | 10/1962 | Blomberg ................................. | 475/230 |
| 4,466,300 | 8/1984 | Takahashi ............................ | 475/230 X |
| 4,541,306 | 9/1985 | Hokusho et al. ....................... | 475/230 |
| 4,733,578 | 3/1988 | Glaze et al. ......................... | 475/230 X |
| 4,776,234 | 10/1988 | Shea . | |
| 4,836,051 | 6/1989 | Guimbretie .......................... | 475/230 X |
| 5,021,038 | 6/1991 | Beigang . | |
| 5,030,181 | 7/1991 | Keller . | |
| 5,102,378 | 4/1992 | Gobert . | |
| 5,131,894 | 7/1992 | Hilker ..................................... | 475/230 |
| 5,139,467 | 8/1992 | Carpenter . | |
| 5,366,421 | 11/1994 | Hirota . | |
| 5,584,777 | 12/1996 | Sander et al. ............................ | 475/230 |
| 5,791,205 | 8/1998 | Ruppert, Jr. ........................... | 74/606 R |

FOREIGN PATENT DOCUMENTS

| | | |
|---|---|---|
| 917132 | 1/1963 | United Kingdom . |
| 1136959 | 12/1968 | United Kingdom . |
| 1142960 | 2/1969 | United Kingdom . |

*Primary Examiner*—Dirk Wright
*Assistant Examiner*—Peter T. Kwon
*Attorney, Agent, or Firm*—Graham & James LLP

[57] ABSTRACT

A differential apparatus has a differential casing, a pinion gear, a pair of side gears engaged with the pinion gear, and a cone clutch for limiting a differential movement between the side gears. In this differential apparatus, the cone clutch is constructed by a female side cone portion formed in an inner circumference of the differential casing, and a male side cone portion formed in an outer circumference of the pair of side gears. The female side cone portion is formed in the shape of a tapered face in which a conical generating line is a straight line. The male side cone portion is formed in the shape of a tapered face having a predetermined curvature and a generating line projecting to the female side cone portion. Thus, no sliding portion is offset to a small diameter portion even when thrust applied to the cone clutch is increased, thereby improving durability of the cone clutch.

8 Claims, 2 Drawing Sheets

DIFFERENTIAL LIMITING MECHANISM OF DIFFERENTIAL APPARATUS

BACKGROUND OF THE INVENTION

The present invention relates to a differential limiting mechanism of a differential apparatus used in a vehicle.

For example, the differential limiting mechanism of a conventional differential apparatus is described in Japanese published (KOKOKU) Patent No. 39-29513.

This differential limiting mechanism includes a cone clutch. The cone clutch is constructed by a pair of female side cone portions and male side cone portions corresponding to the female side cone portions. Each of the female side cone portions is a tapered face formed in the shape of a truncated cone in an inner wall of a differential casing. Each of the male side cone portions is a tapered face formed in an outer circumference of a clutch body arranged behind a side gear and rotated integrally with the side gear. Taper angles of the female and male side cone portions are in conformity with each other, and the female and male side cone portions come in face contact with each other.

The cone clutch is pressed by biasing force of a spring mechanism at any time and is pressed by thrust applied to each side gear at an operating time of the differential apparatus. When a difference in driving resistance is caused between left-hand and right-hand output shafts, a difference in rotation is caused between the female and male side cone portions. Therefore, sliding friction is generated in the cone clutch so that a differential rotation of both the output shafts is limited by this frictional force.

SUMMARY OF THE INVENTION

However, when an excessive thrust is applied to the cone clutch, a female side cone portion is deformed and enlarged. As a result, the female and male side cone portions strongly come in contact with each other on an end portion side of a small diameter. Accordingly, there is a possibility that a sliding portion of both the cone portions is offset on the end portion side of the small diameter. Here, in the relation between a diametrical size and a heating amount caused by a sliding movement, the heating amount is increased in inverse proportion to the diametrical size. Accordingly, when the sliding portion of the female and male side cone portions is offset on the end portion side of the small diameter, the heating amount of the sliding portion is excessively increased so that the end portion of the small diameter tends to be worn, burned, etc. Further, when the wearing is advanced, the flow of a lubricating oil is prevented and the heating of the sliding portion is promoted. Further, galling tends to be caused since a contact angle of the end portion of a small diameter on a male side with respect to the female side cone portion is a sharp angle. Therefore, there is a fear of a reduction in durability of the differential apparatus.

Therefore, an object of the present invention is to provide a differential limiting mechanism of a differential apparatus capable of restraining wearing, galling, burning, etc. of a sliding portion and improving durability of the differential apparatus.

To achieve the above object, a differential limiting mechanism of the present invention is arranged in a differential apparatus which has a differential casing receiving an input from an engine and rotated around a main rotating axis as a center, a pinion shaft arranged within the differential casing and extending in a direction crossing the main rotating axis and rotated integrally with the differential casing, a pinion gear rotatably arranged around an axis of the pinion shaft, and a pair of output side gears rotatably arranged with the main rotating axis as a center and engaged with the pinion gear and receiving thrust force at a differential rotating time. The differential limiting mechanism limits a differential movement between the pair of side gears and comprises first and second cone portions. The first cone portion is formed in the shape of a tapered face around the main rotating axis such that the first cone portion is arranged within the differential casing and is rotated integrally with one of the pair of side gears and is inclined with respect to the main rotating axis. The second cone portion is formed in the shape of a tapered face such that the second cone portion is arranged within the differential casing and is rotated integrally with the differential casing and is inclined opposite to the first cone portion and is pressed by the first cone portion and is slid together with this first cone portion when the one of the side gears receives the thrust force. The first and second cone portions come in contact with each other so as to prevent the contact between the first and second cone portions only in a small diameter portion most proximate to the main rotating shaft in a state in which the side gear receives the thrust force.

In the above construction, both the cone portions do not come in contact with each other only in the small diameter portion most proximate to the main rotating axis and are not slid even when the side gear receives a large thrust force. Here, in the relation between the size of a rotating radius and a heating amount caused by the sliding movement, the heating amount is increased in inverse proportion to the size of the rotating radius. In the above construction, the first and second cone portions do not come in contact with each other only in the small diameter portion and are not slid so that no heating amount of a sliding portion is excessively large and this sliding portion is not easily worn, burned, etc. Since the wearing of the sliding portion is restrained, no flow of a lubricating oil is prevented and no heating is promoted so that no burning of the sliding portion is also easily caused from this point. Further, since no sliding portion of both the cone portions is constructed by only the small diameter portion, no contact angle of both the cone portions is set to a sharp angle so that no galling is easily caused. Therefore, a stable differential limiting force is obtained and durability of the differential limiting mechanism is improved.

The second cone portion can be set to a female side cone portion as an inner circumferential face of a hole approximately formed in the shape of a truncated cone with the main rotating axis as a center. The first cone portion can be set to a male side cone portion inserted into the female side cone portion.

In the above construction, the female and male side cone portions come in contact with each other in a portion except for the small diameter portion and are slid even when the side gear receives the large thrust force and the female side cone portion is deformed and enlarged in diameter. Accordingly, wearing, galling, burning, etc. of this sliding portion are not easily caused so that durability of the differential limiting mechanism is improved.

The male side cone portion can be formed on an outer circumferential face of one of the side gears, and the female side cone portion can be formed on an inner wall face of the differential casing.

In the above construction, the male and female side cone portions are respectively arranged in the side gear and the differential casing so that the number of parts can be reduced.

The first cone portion can be formed in two positions respectively corresponding to the pair of side gears, and the second cone portion can be formed in two positions corresponding to the two positions of the first cone portion.

In the above construction, a differential movement of both the side gears can be limited in a preferable balance.

The female side cone portion can be formed in the shape of a tapered face having a conical generating line of a straight line shape inclined toward the main rotating axis. The male side cone portion can be formed in the shape of a tapered face having a predetermined curvature and a generating line projecting to the female side cone portion.

In the above construction, for example, if the male side cone portion is formed such that the male side cone portion comes in contact with an intermediate portion of the conical generating line of the female side cone portion at an assembly time and clearances are caused in a large diameter portion and the small diameter portion, both the cone portions come in contact with each other in the intermediate portion of the conical generating line when thrust applied to a side gear is small. No contact is caused in the small diameter portion and both the cone portions come in contact with each other on a curved surface even when large thrust is applied to the side gear and the female side cone portion is deformed and enlarged in diameter. Accordingly, generation of galling, burning, etc. of a small diameter end is further prevented and a stabler differential limiting force is obtained and durability of the differential limiting mechanism is improved.

A center of the curvature of the male side cone portion can be set in an area in which no small diameter portion is included in two divisional areas formed with a bisector of the conical generating line of the female side cone portion as a boundary.

The male side cone portion can be formed such that a curvature radius on a small diameter side proximate to the main rotating axis is smaller than that on a large diameter side separated from the main rotating axis.

In the above construction, a clearance in the small diameter portion of the cone portions is greatly formed at the assembly time. Thus, it is possible to reliably avoid that the cone portions are slid in the small diameter portion even when large thrust is applied to the side gear.

Further, both the female and male side cone portions can be formed in the shape of a tapered face having a conical generating line of a straight line shape inclined toward the main rotating axis. Inclination angles of the conical generating lines of the female and male side cone portions can be set to be different from each other such that both the cone portions come in contact with each other in a large diameter portion farthest from the main rotating axis in an initial state in which no side gear receives the thrust force.

In the above construction, when the thrust force applied to the side gear is small, the cone portions are slid at a large diameter end thereof. In contrast to this, when the thrust force is increased and the female side cone portion is enlarged, both the cone portions entirely come in contact with each other and are slid. Thus, a stable differential limiting force is obtained and durability of the differential limiting mechanism is improved.

DESCRIPTION OF THE PREFERRED EMBODIMENTS

First embodiment

Figure 1:
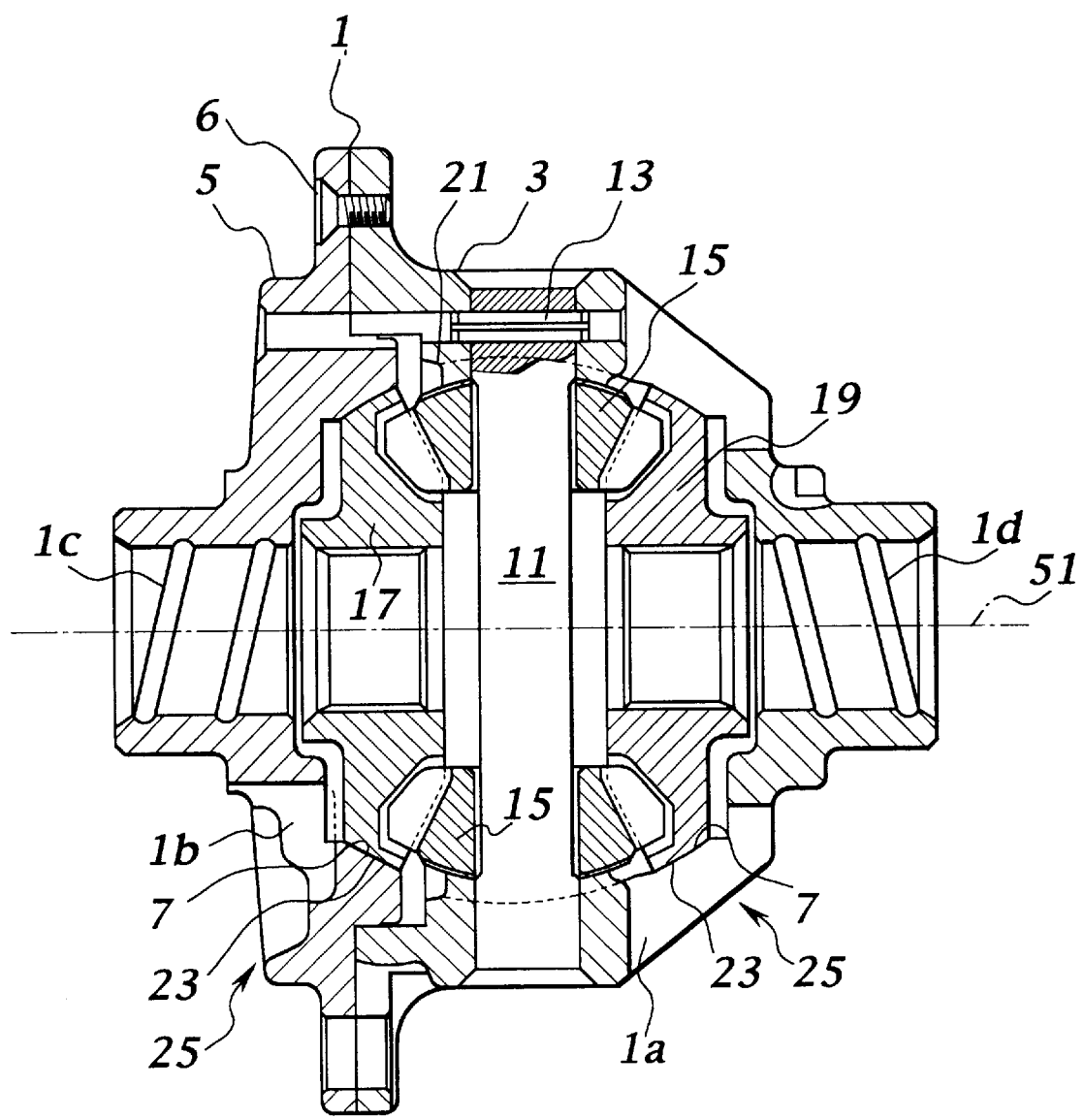
FIG. 1 is a cross-sectional view of a differential apparatus having a differential limiting mechanism in a first embodiment.
Figure 2:
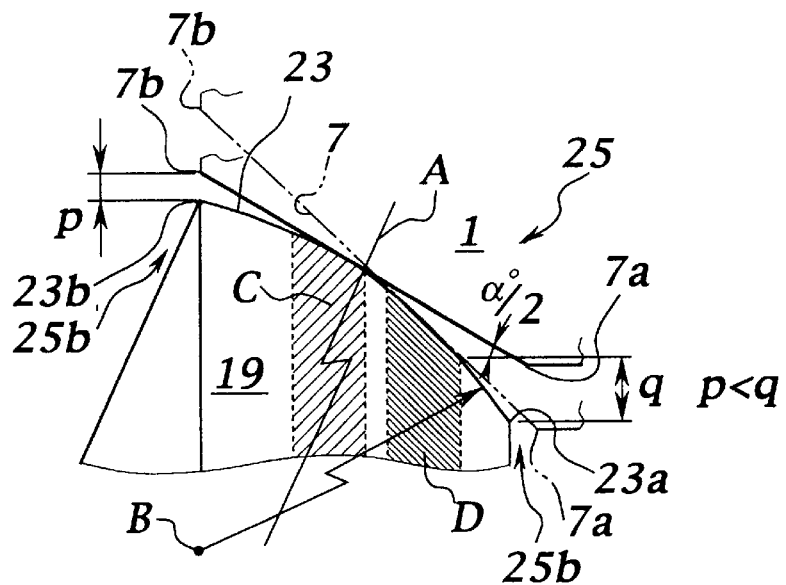
FIG. 2 is an enlarged view of a main portion of a cone clutch in the first embodiment.

A first embodiment of the present invention will be explained with reference to FIGS. 1 and 2. FIG. 1 is a cross-sectional view of a differential apparatus having a cone clutch (differential limiting mechanism) in this embodiment. FIG. 2 is an enlarged view of a main portion of the cone clutch.

As shown in FIG. 1, a differential casing 1 has a body 3 and a cover 5 coupled to each other by a bolt 6. An unillustrated ring gear is fixed to the differential casing 1 and the differential casing 1 is rotated by an engine through the ring gear. The entire differential apparatus is rotatably supported within an unillustrated differential carrier with a main rotating axis as a center and is lubricated by a reservoired oil. Openings 1a, 1b and oil grooves 1c, 1d for lubricating the interior of the differential casing 1 are formed in the differential casing 1.

Female side cone portions 7, 7 are formed on an inner circumferential wall face of the differential casing 1. As shown in FIG. 2, each of the female side cone portions 7, 7 is an inner circumferential face of a hole approximately formed in the shape of a truncated cone with the main rotating axis of the differential casing 1 as a center and is formed in the shape of a tapered face having a conical generating line of a straight line as a small diameter toward the exterior of the main rotating axis. Each of taper angles of the female side cone portions 7, 7 is set to a predetermined angle α° (25° in this embodiment).

As shown in FIG. 1, a pinion shaft 11 is attached into the differential casing 1 by a spring pin 13. Two pinion gears 15 are rotatably arranged around the pinion shaft 11 and are respectively engaged with a pair of left-hand and right-hand output side gears 17, 19 opposed to each other. Unillustrated left-hand and right-hand output shafts are respectively spline-connected to inner circumferences of the side gears 17, 19. A spherical washer 21 receives thrust of the pinion gear 15.

Male side cone portions 23, 23 are formed in the shape of a truncated cone (in the shape of a tapered face) in outer circumferences of the side gears 17, 19 and are respectively slid with respect to the female side cone portions 7, 7 of the differential casing 1. However, different from a female side cone portion 7, a male side cone portion 23 has a conical generating line of a predetermined curvature projecting to the corresponding cone portion 7.

As shown in FIG. 2, a curvature center of the conical generating line of the male side cone portion 23 is set to a point B offset by a predetermined amount inside (leftward) a bisector A of the conical generating line of the female side cone portion 7 in a direction of the rotating main axis 51 in a state in which the side gears 17, 19 are assembled. In other words, two divisional areas are formed with the bisector A of the conical generating line of the female side cone portion 7 as a boundary, and the curvature center B is formed in an area (an area including large diameter portions 7b, 23b separated from the rotating main axis 51) in which no small diameter portions 7a, 23a of both the cone portions 7, 23 proximate to the rotating main shaft 51 are included in these divisional areas. Thus, the male side cone portion 23 comes in contact with an intermediate portion of the female side cone portion 7 and the clearance (initial clearance) between both the cone portions 7 and 23 at an assembly time becomes p (5 μm) in the large diameter portions 7b, 23b and becomes q (15 μm) in the small diameter portions 7a, 23a. Accordingly, the relation of both the initial clearances is shown by q>p. Thus, the cone clutches 25, 25 are constructed as a differential limiting mechanism.

Next, an operation of each cone clutch 25 will be explained.

When the left-hand and right-hand output shafts have the same number of rotations, the left-hand and right-hand side gears 17, 19 have the same number of rotations so that no pinion gear 15 is rotated. Therefore, no side gears 17, 19 receive thrust force and no cone portions 7, 23 are slid.

In contrast to this, when the numbers of rotations of the left-hand and right-hand output shafts are different from each other, a difference in driving resistance is caused between the side gears 17 and 19 so that the differential apparatus is operated and the pinion gear 15 is rotated. At this time, each of the left-hand and right-hand side gears 17, 19 receives thrust force by its engagement with the pinion gear 15 and the male side cone portions 23, 23 are respectively pressed against the female side cone portions 7, 7. Namely, the cone clutch 25 is relatively rotated in a state in which the cone clutch 25 receives thrust according to an input torque. Thus, both the cone portions 7, 23 are slid. A differential movement between the side gears 17 and 19 is limited by this sliding friction.

When the input torque (thrust force) is small, as shown in FIG. 2, an approximately central portion (intermediate portion) of the male side cone portion 23 shown by a slanting line C is set to a sliding range of the male side cone portion 23 and the female side cone portion 7.

When the thrust force is increased, the female side cone portion 7 is deformed and enlarged as shown by a two-dotted slanting line, and the above sliding range is moved to a range shown by a slanting line D. However, both the cone portions 7, 23 do not come in contact with each other in the small diameter portion 25a even in this case. Accordingly, there is no fear of generation of a strong hit against the small diameter portion 25a.

In the meantime, a lubricating oil within the differential carrier flows from the openings 1a, 1b and the oil grooves 1c, 1d formed in the differential casing 1 and lubricates engaging portions, etc. of the respective gears of the cone clutch 25 and the interior of the differential casing 1.

In accordance with this embodiment, both the cone portions 7, 23 come in contact with each other and are slid at any time in a portion (intermediate portion) except for the small diameter portion 25a most proximate to the main rotating axis 51 even when the side gears 17, 19 receive a large thrust force and the female side cone portion 7 is deformed and enlarged in diameter. Here, in the relation between a distance (the size of a rotating radius) from the rotating axis and a heating amount caused by the sliding movement, the heating amount is increased in inverse proportion to the size of the rotating radius. Namely, in the case of the same number of rotations, the heating amount is increased as the distance from the rotating axis is reduced. The heating amount is reduced as the distance from the rotating axis is increased. Accordingly, no heating amount of a sliding portion is excessively large even when the side gears 17, 19 receive the large thrust force. Therefore, this sliding portion is not easily worn, burned, etc.

Since the wearing of the sliding portion is restrained, no flow of the lubricating oil is prevented and no heating is promoted so that no burning is also caused easily from this point.

Further, both the cone portions 7, 23 are not slid in the small diameter portion 25a. Accordingly, no contact angle of both the cone portions 7, 23 in the sliding portion is a sharp angle so that no galling is easily caused.

Therefore, a stable differential limiting force is obtained and durability of the differential limiting mechanism is improved.

Further, the female side cone portion 7 is formed in the shape of a tapered face having a conical generating line of a straight line shape inclined toward the main rotating axis 51. The male side cone portion 23 is formed in the shape of a tapered face having a predetermined curvature and a generating line projecting to the female side cone portion 7. Therefore, both the cone portions 7, 23 come in contact with each other on a curved surface in the intermediate portion at any time. Accordingly, both the cone portions 7, 23 can come in contact with each other in a relatively wide range at any time, and heat caused by the sliding movement can be preferably reduced.

Further, the center of curvature of the male side cone portion 23 is arranged in an area in which no small diameter portions 7a, 23a are included in two divided areas provided with the bisector A of the conical generating line of the female side cone portion 7 as a boundary. Accordingly, the initial clearance q between the cone portions 7, 23 in the small diameter portion 25a is set to be larger than that in the large diameter portion 25b at an assembly time. Thus, it is possible to reliably avoid that the cone portions 7, 23 are slid by the small diameter portions 7a, 23a even when the large thrust force is applied to these cone portions.

The male side cone portion 23 is formed on an outer circumferential face of each of the side gears 17, 19 and the female side cone portion 7 is formed on an inner wall face of the differential casing 1 so that the number of parts can be reduced.

Further, the male side cone portion 23 is formed in each of outer circumferences of the pair of side gears 17, 19 and the female side cone portion 7 is formed in two positions corresponding to two positions of the male side cone portion 23. Accordingly, a differential movement of both the side gears 17, 19 can be limited in a preferable balance.

Second embodiment

Figure 3:
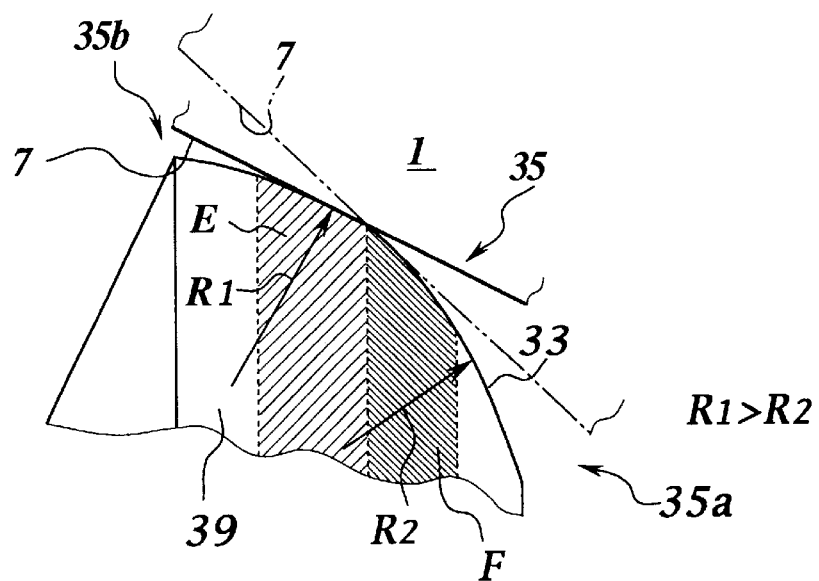
FIG. 3 is an enlarged view of a main portion of a cone clutch in a second embodiment.

A second embodiment of the present invention will be explained with reference to FIG. 3. FIG. 3 is an enlarged view of a main portion of a cone clutch in accordance with this embodiment.

This embodiment differs from the above first embodiment in the shape of a male side cone portion 33 of a pair of left-hand and right-hand output side gears 37, 39. The other constructions are the same as the first embodiment. Accordingly, this different point will be explained and an overlapping explanation is omitted in the following description.

As shown in FIG. 3, a conical generating line of the male side cone portion 33 is formed such that this conical generating line on the side of a large diameter portion 35b of a cone clutch 35 is different in curvature from that on the side of a small diameter portion 35a with an approximately central portion of a female side cone portion 7 as a boundary. Curvature radii R1 (690 mm) and R2 (130 mm) on the respective sides of the large diameter portion 35b and the small diameter portion 35a are set such that the curvature radius R1 on the side of the large diameter portion 35b is larger than the curvature radius R2 on the side of the small diameter portion 35a (R1>R2). An initial clearance of the small diameter portion 35a is set to be larger than that of the large diameter portion 35b. Thus, the cone clutch 35 is constructed as a differential limiting mechanism.

In such a construction, when an input torque (thrust force) is small at an operating time of the differential apparatus, an approximately central portion (intermediate portion) of the male side cone portion 33 shown by a slanting line E is set to a sliding range of the male side cone portion 33 and the female side cone portion 7 as shown in FIG. 3. When the thrust force is increased, the female side cone portion 7 is deformed and enlarged as shown by a two-dotted chain line so that the above sliding range is moved to a range shown by a slanting line F. However, there is no fear of generation of a strong hit in the small diameter portion 35a.

The number of curvatures for setting the clearance is not limited to one in each of large and small diameter sides, but may be set to be plural.

Thus, in accordance with this embodiment, the curvature radii of the male side cone portion 33 on the large and small diameter sides are set to R1>R2, and the initial clearance of the small diameter portion 35a is set to be larger than that of the large diameter portion 35b. Accordingly, no strong hit against the small diameter portion 35a is caused even when the thrust is increased. Therefore, generation of galling, burning, etc. of a small diameter end is prevented and a stable differential limiting force is obtained and durability of the cone clutch 35 is improved.

Third embodiment

Figure 4:
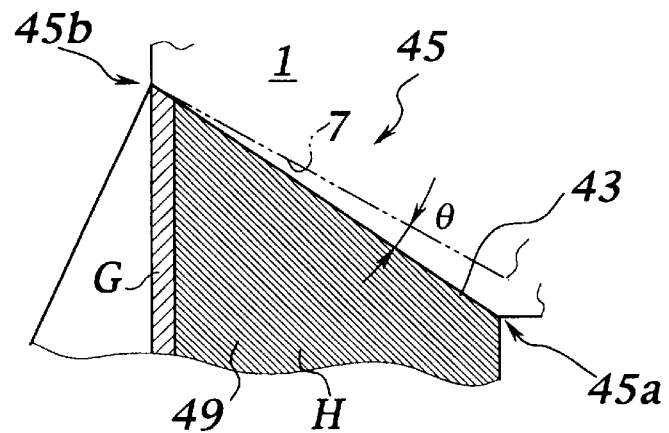
FIG. 4 is an enlarged view of a main portion of a cone clutch in a third embodiment.

A third embodiment of the present invention will be explained with reference to FIG. 4. FIG. 4 is an enlarged view of a main portion of a cone clutch.

This embodiment differs from the above first embodiment in that conical generating lines of both a female side cone portion 7 of a differential casing 1 and a male side cone portion 43 of side gears 47, 49 are straight lines. The other constructions are the same as the first embodiment. Accordingly, this different point will be explained and an overlapping explanation is omitted in the following description.

The female side cone portion 7 is formed at a taper angle $\alpha°$ (same as the first embodiment, 25°). In contrast to this, the male side cone portion 43 is formed at a taper angle large by $\theta°$ on one side as shown in FIG. 4 and comes in contact with the female side cone portion 7 at its large diameter end. Thus, a cone clutch 45 is constructed as a differential limiting mechanism.

In such a construction, when the differential apparatus is operated and an input torque (thrust) is small, a large diameter portion 45b of the cone clutch 45 shown by a slanting line G is set to a sliding range as shown in FIG. 4. When the thrust is increased, the female side cone portion 7 is deformed and enlarged as shown by a two-dotted chain line and the above sliding range is moved to a range shown by a slanting line H so that a sliding movement is almost entirely made. In this case, there is a possibility that both the cone portions 7, 49 also come in contact with each other in a small diameter portion 45a. However, both the cone portions 7, 49 reliably come in contact with each other in a portion except for the small diameter portion 45a. Accordingly, both the cone portions 7, 49 do not come in contact with each other only in the small diameter portion 45a. Thus, generation of galling, burning, etc. of the small diameter portion 45a is prevented and a stable differential limiting force is obtained and durability of the cone clutch 45 is improved.

Further, when the thrust force is small, the sliding range is narrow. In contrast to this, when the thrust force is large, the sliding range is widened. Accordingly, heat can be more efficiently reduced.

In each of the above embodiments, the male side cone portion may be arranged separately from the side gear and the female side cone portion may be arranged separately from the differential casing. For example, a clutch body may be arranged to be adjacent to the side gear such that the clutch body is rotated integrally with the side gear. In this case, the male side cone portion may be formed in an outer circumference of the clutch body.

Further, the male side cone portion can be arranged on a side of the differential casing and the female side cone portion can be arranged on a side of the side gear.

What is claimed is:

1. A differential limiting mechanism arranged in a differential apparatus which has a differential casing receiving an input from an engine and rotated around a main rotating axis as a center, a pinion shaft arranged within said differential casing and extending in a direction crossing said main rotating axis and rotated integrally with said differential casing, a pinion gear rotatably arranged around an axis of said pinion shaft, and has a pair of output side gears rotatably arranged with said main rotating axis as a center and engaged with said pinion gear and receiving thrust force at a differential rotating time; said differential limiting mechanism limiting a differential movement between said pair of side gears and comprising:

a first cone portion formed in the shape of a tapered face around the main rotating axis such that the first cone portion is arranged within said differential casing and is rotated integrally with one of said pair of side gears and is inclined with respect to said main rotating axis; and a second cone portion formed in the shape of a tapered face such that the second cone portion is arranged within said differential casing and is rotated integrally with the differential casing and is inclined opposite to said first cone portion and is pressed by said first cone portion and is slid together with said first cone portion when said one of the side gears receives the thrust force;

said first and second cone portions coming in contact with each other so as to prevent the contact between the first and second cone portions only in a small diameter portion most proximate to said main rotating shaft in a state in which said side gear receives the thrust force.

2. The differential limiting mechanism of the differential apparatus according to claim 1, wherein said second cone portion is a female side cone portion as an inner circumferential face of a hole approximately formed in the shape of a truncated cone with said main rotating axis as a center, and said first cone portion is a male side cone portion inserted into said female side cone portion.

3. The differential limiting mechanism of the differential apparatus according to claim 2, wherein said male side cone portion is formed on an outer circumferential face of said one of the side gears, and said female side cone portion is formed on an inner wall face of said differential casing.

4. The differential limiting mechanism of the differential apparatus according to claim 1, wherein said first cone portion is formed in two positions respectively corresponding to said pair of side gears, and said second cone portion is formed in two positions corresponding to said two positions of the first cone portion.

5. The differential limiting mechanism of the differential apparatus according to claim 2, wherein said female side cone portion is formed in the shape of a tapered face having a conical generating line of a straight line shape inclined toward said main rotating axis, and said male side cone portion is formed in the shape of a tapered face having a predetermined curvature and a generating line projecting to said female side cone portion.

6. The differential limiting mechanism of the differential apparatus according to claim 5, wherein the curvature of said male side cone portion is provided by setting a point as a center in an area in which said small diameter portion is not included in two divisional areas formed with a bisector of the conical generating line of said female side cone portion as a boundary.

7. The differential limiting mechanism of the differential apparatus according to claim 5, wherein said male side cone portion has different curvatures on a small diameter side proximate to said main rotating axis and a large diameter side separated from said main rotating axis, and a curvature radius on said small diameter side is smaller than that on said large diameter side.

8. The differential limiting mechanism of the differential apparatus according to claim 1, wherein both said female and male side cone portions are formed in the shape of a tapered face having a conical generating line of a straight line shape inclined toward said main rotating axis, and inclination angles of the conical generating lines of said female and male side cone portions are different from each other such that said both cone portions come in contact with each other in a large diameter portion farthest from said main rotating axis in an initial state in which said side gear does not receive the thrust force.

* * * * *